(12) United States Patent
Ollila et al.

(10) Patent No.: US 11,548,388 B2
(45) Date of Patent: Jan. 10, 2023

(54) POINTER FOR ILLUMINATING BAR GRAPH GAUGES

(71) Applicant: Continental Automotive Systems, Inc., Deer Park, IL (US)

(72) Inventors: Curt Ollila, Fenton, MI (US); Michael E Carrel, Northville, MI (US); Vyacheslav B Birman, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1477 days.

(21) Appl. No.: 15/382,659

(22) Filed: Dec. 17, 2016

(65) Prior Publication Data

US 2021/0316610 A1   Oct. 14, 2021

Related U.S. Application Data

(60) Provisional application No. 62/268,780, filed on Dec. 17, 2015.

(51) Int. Cl.
*B60K 35/00* (2006.01)
*G01D 13/26* (2006.01)

(52) U.S. Cl.
CPC ........... *B60K 35/00* (2013.01); *G01D 13/265* (2013.01); *B60K 2370/152* (2019.05); *B60K 2370/332* (2019.05)

(58) Field of Classification Search
CPC .............. B60K 35/00; B60K 2370/152; B60K 2370/332; G01D 13/265
See application file for complete search history.

(56) References Cited

U.S. PATENT DOCUMENTS 6,817,310 B2 * 11/2004 Sugiyama .............. G01D 13/04
116/62.4
7,677,744 B2    3/2010 Birman et al.
8,881,038 B1 * 11/2014 Palmer ................... G06T 11/20
715/764

(Continued)

FOREIGN PATENT DOCUMENTS

JP         2005147742 A     6/2005

OTHER PUBLICATIONS

Machine translation of JP2005147742 (originally published 2005), Japan platform for patent information, https://www.j-platpat.inpit.go.jp/p0200 (Year: 2005).*

(Continued)

*Primary Examiner* — Christopher E Leiby (57) ABSTRACT

A pointer for a gauge or an instrument cluster assembly is provided. The pointer is formed of a light conducting material. In one form, indicia are disposed about the axis of rotation and/or on a surface, the plurality of indicia configured to be selectively illuminated by the pointer. A second end of the pointer may be configured to be selectively rotated adjacent to each indicium of the plurality of indicia and to illuminate the indicia when the light guide pointer is disposed adjacent to the indicia. The second end may be wider than a first end of the pointer. In some variations, the pointer may have a fan shape, and the indicia may be configured as tick marks defining a bar graph. In some forms, opaque material may be disposed on the pointer, the opaque material defining a plurality of indicia on the pointer.

17 Claims, 10 Drawing Sheets

(56) References Cited

U.S. PATENT DOCUMENTS

| | | |
|---|---|---|
| 2005/0146893 A1 | 7/2005 | Ford et al. |
| 2010/0071611 A1* | 3/2010 | Krishnamurthy .... G01D 13/265 |
| | | 116/288 |
| 2015/0103509 A1* | 4/2015 | Sato ....................... G01D 11/28 |
| | | 362/23.14 |

OTHER PUBLICATIONS

Search Report dated Jun. 24, 2016, from corresponding GB Patent Application No. GB1601695.8.

* cited by examiner

POINTER FOR ILLUMINATING BAR GRAPH GAUGES

TECHNICAL FIELD

The present disclosure relates to vehicle instrument clusters and gauges, and more specifically to a pointer that may be used in a vehicle instrument cluster and gauge.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels, typically having several gauges and dials that communicate vehicle conditions such as speed, engine RPM, temperature, oil pressure along with many other operational parameters.

Each vehicle gauge typically includes a pointer that rotates about an axis to point to a specific graphic on the gauge dial to indicate a current vehicle operating parameter. Pointer assemblies can be illuminated. In some variations, a light housing forms a plurality of pockets containing light sources, which is covered by a gauge surface. A plurality of tick marks or indicia, or a translucent or transparent surface may be formed by the gauge surface over the pockets. The light sources in the pockets may be selectively illuminated as the pointer travels over them, by way of example, to form a bar graph display.

Typically, a wall is disposed between each pocket to prevent light leakage from one pocket to another, in order to display an appearance of a discrete value. Each wall must necessarily have a certain thickness separating each pocket. Every pocket has its own light source, and therefore, a number of LEDs or other light sources, along with associated electronics, are required.

It is desirable to provide and develop gauge assemblies that provide substantially uniform illumination, but with ample lighting and minimal electronics. Accordingly, it is desirable to design and develop a pointer assembly and gauge that meets such criteria.

SUMMARY

A gauge assembly having a pointer is provided that is configured to illuminate a bar graph without the need for a dedicated light source in each pocket forming the bar graph. Instead, a light guide pointer is used to selectively illuminate sections of a bar graph. The light guide pointer may have a wide end, such as a fan shape, to illuminate a greater number of tick marks as the light guide pointer moves along a scale.

In one form, which may be combined with or separate from the other forms provided herein, a gauge assembly for a motor vehicle is provided. The gauge assembly includes a light guide pointer supported for rotation about an axis of rotation. The light guide pointer has a first end disposed over the axis of rotation and a second end disposed a distance away from the axis of rotation. The second end is wider than the first end. A plurality of indicia is disposed about the axis of rotation. The plurality of indicia is configured to be selectively illuminated by the light guide pointer. The second end of the light guide pointer is configured to be selectively rotated adjacent to each indicium of the plurality of indicia and to illuminate each indicium when the second end of the light guide pointer is disposed adjacent to each indicium.

In another form, which may be combined with or separate from the other forms disclosed herein, a pointer for an instrument cluster assembly of a motor vehicle is provided. The pointer has a body portion formed of a light conducting material. The body portion is configured to receive rays of light from a light source and conduct the rays through the body portion. The body portion has an inner end and an outer end. The outer end is wider than the inner end, and the body portion has a fan shape. Opaque material is disposed on the body portion. The opaque material defines a plurality of indicia on the pointer.

In yet another form, which may be combined with or separate from the other forms disclosed herein, an instrument cluster assembly for displaying information in a motor vehicle is provided. The instrument cluster assembly includes at least one light source and a pointer formed of a light conducting material. The pointer is configured to receive rays from the light source(s) and conduct the rays through the pointer. The instrument cluster assembly also includes an appliqué surface, and the pointer is movable with respect to the appliqué surface. The appliqué surface defines a plurality of indicia configured to indicate information. The plurality of indicia is configured to be selectively illuminated by the pointer. The pointer is configured to be selectively moved adjacent to each indicium of the plurality of indicia and to illuminate the plurality of indicia when the pointer is disposed adjacent to the plurality of indicia.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

Examples are reflected in the drawings, which will be described below. The drawings described herein are for illustration purposes only and are not intended to limit the scope of the present disclosure in any way.

DETAILED DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1A:
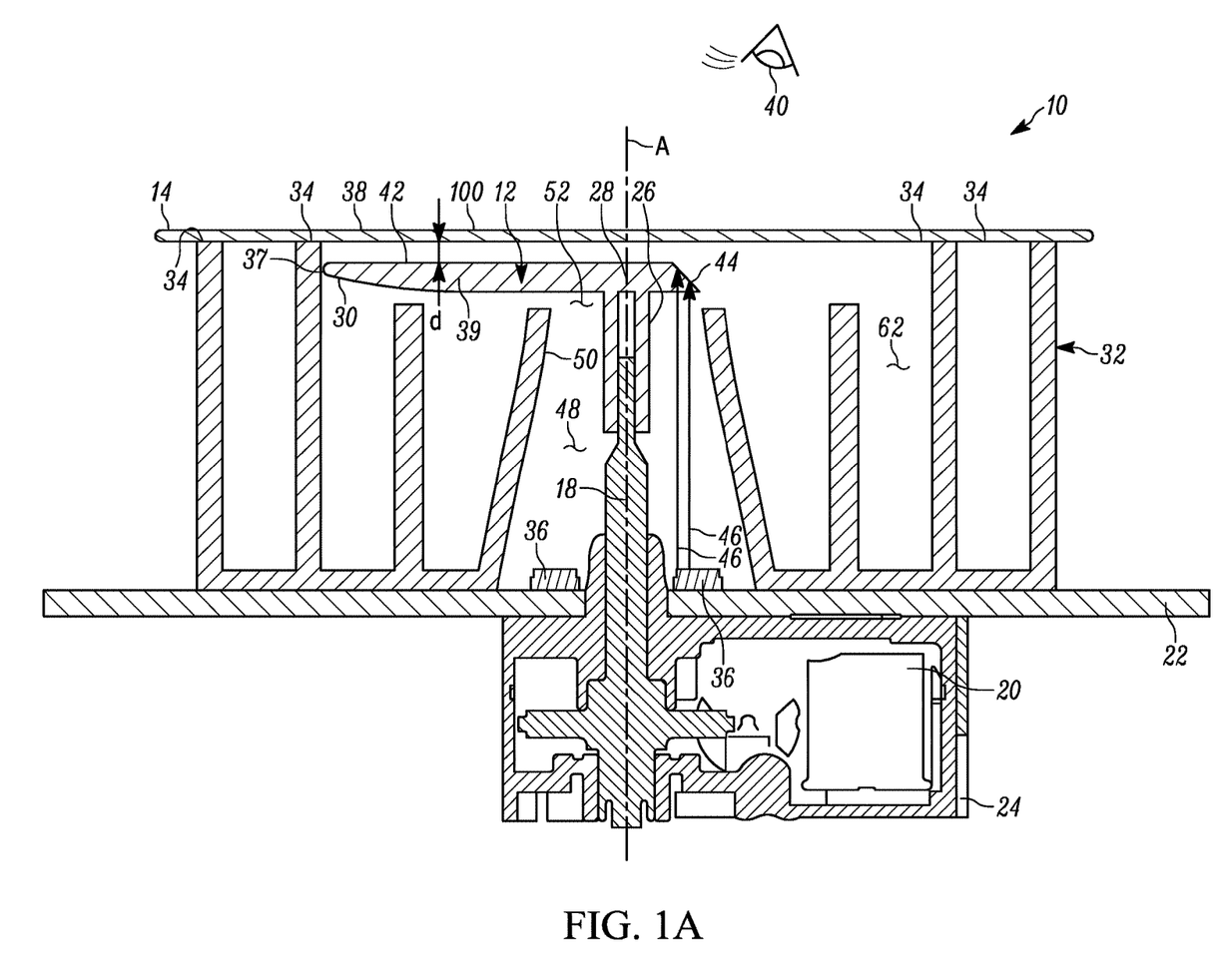
FIG. 1A is a cross-sectional side view of a gauge assembly having a light guide pointer, in accordance with the principles of the present disclosure.
Figure 1B:
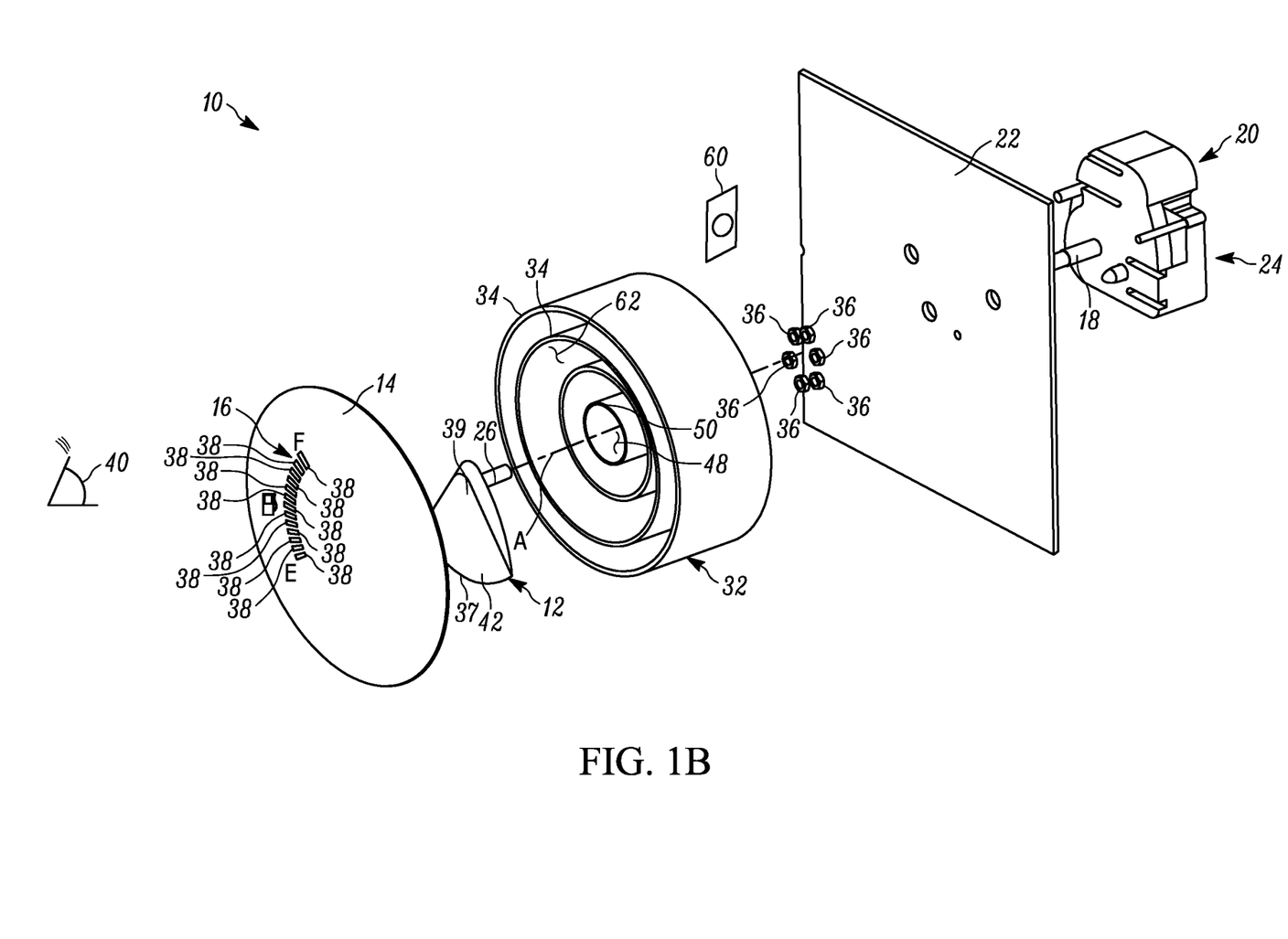
FIG. 1B is an exploded perspective view of the gauge assembly of FIG. 1A, according to the principles of the present disclosure.

Referring to FIGS. 1A-1B, a gauge assembly, which may be an instrument cluster assembly, is illustrated and generally designated at 10. The gauge assembly or instrument cluster assembly 10 may be used in a motor vehicle, by way of example. Information given by the gauge assembly 10 may include, by way of example, tachometer information, vehicle speed information, fuel level information, engine temperature, or any other information that is desired to communicate to the driver of the vehicle.

The gauge assembly 10 includes a pointer 12 that is configured to rotate about an axis of rotation A, wherein the axis of rotation A extends through an appliqué surface or gauge face 14 to indicate a specific operating parameter. Several indicia 16, such as speed values or fuel level markers, are located on the gauge face 14. The indicia 16 are disposed in a generally circular pattern about the axis of rotation A. In this example, the indicia 16 are disposed over a portion of an invisible circle that surrounds the axis of rotation A, but it should be understood that the indicia 16 may be disposed around more of the axis of rotation A, such as in an entire circle around the axis of rotation A, or in another pattern that is not centered around the axis of rotation A.

The pointer 12 is configured to rotate or move with respect to the gauge face 14, about the axis A. For example, the pointer 12 may be mounted to a shaft 18 that is connected to and driven by a stepper motor 20. The stepper motor 20 may be mounted to or connected to a printed circuit board 22. In the illustrated example, the stepper motor 20 is mounted to the printed circuit board 22 through a motor housing 24. The stepper motor 20 is configured to rotate the shaft 18 that is coaxial with the axis of rotation A. As the shaft 18 is fixedly connected to a stem 26 of the pointer 12, the pointer 12 rotates with the shaft 18. Thus, the pointer 12 is supported for rotation about the axis of rotation A.

The pointer 12 is a light guide. The pointer 12 may be formed of a light conducting material that is configured to receive rays and conduct the rays therethrough. Thus, the pointer 12 is configured to receive and conduct light. The pointer 12 has a first end 28, or inner end or proximal end, disposed over the axis of rotation A and a second end 30, or outer end or distal end, disposed a non-zero distance away from the axis of rotation A.

The pointer 12 is disposed within a light housing 32, which is configured to minimize or prevent light leakage from the gauge assembly 10 to other gauges and/or components. The gauge face 14 is attached to one or more front edges 34 of the light housing 32.

At least one light source, such as an LED package 36 or a plurality of LED packages 36 (in this example, six LED packages 36), is configured to provide light to the pointer 12. Although six LED packages 36 are shown, more or fewer LEDs 36 could be used, if desired. The LEDs 36 are disposed directly on the PCB 22, in this example. The LEDs 36 are disposed in a circular pattern around the axis of rotation A and are offset from the axis of rotation A. The LEDs 36 are disposed adjacent to the first end 28 of the pointer 12. The pointer 12 is thus illuminated by the light sources 36 that are disposed about the axis A, and not along the axis A. Because the LEDs 36 are disposed about the axis A, different rotational positions o the pointer 12 expose the pointer 12 to different amounts of light and to different of the LEDs 36. The example pointer 12 is provided with features that reflect the light to provide for the substantially uniform distribution and propagation of light along the entire pointer 12.

The light housing 32 surrounds the axis A and the shaft 18 and stem 26 and also provides space for the plurality of LED packages 36. The light housing 32 provides for the blocking or confinement of light as it propagates upward (in the orientation of FIG. 1) into the pointer 12.

In this example, the pointer 12 has a fan shape, or a pie-piece shape. The second end 30 is wider than the first end 28, and the second end has a curved edge 37, in this example. The pointer 12 is formed of a light guide material and is configured to receive light from at least one LED 36 and conduct the light through the body 39 of the pointer 12.

The plurality of indicia 16 is disposed on the gauge face 14 about the axis of rotation A, wherein the gauge face 14 defines the indicia 16. Each indicium 16 may be disposed equidistant from the axis of rotation A. The indicia 16 may comprise tick marks 38 arranged into a curved bar graph. The tick marks 38 may be formed as pockets or cut-outs in the gauge face 14, by way of example, which are separated by a divider portion of the gauge face 14. The gauge face 14 may be opaque or translucent, or substantially opaque, by way of example. In some variations, dead front material may be printed on the dial, or gauge face 14, which may define the tick marks 38.

The plurality of indicia 16 are configured to be selectively illuminated by the light guide pointer 12. For example, the second end 30 of the pointer 12 is configured to be selectively rotated adjacent to each indicium or tick mark 38 and to illuminate each tick mark 38 when the light guide pointer 12 is disposed adjacent to each tick mark 38. More particular, the second end 30 of the pointer 12 illuminates a tick mark 38 when the pointer 12 overlaps with that tick mark 38. The pointer 12 is disposed a distance d from the gauge face 14 so that the pointer 12 may be disposed approximately a distance d from a tick mark 38 when the pointer 12 overlaps with the tick mark 38 and is disposed adjacent to the tick mark 38.

Figure 2A:
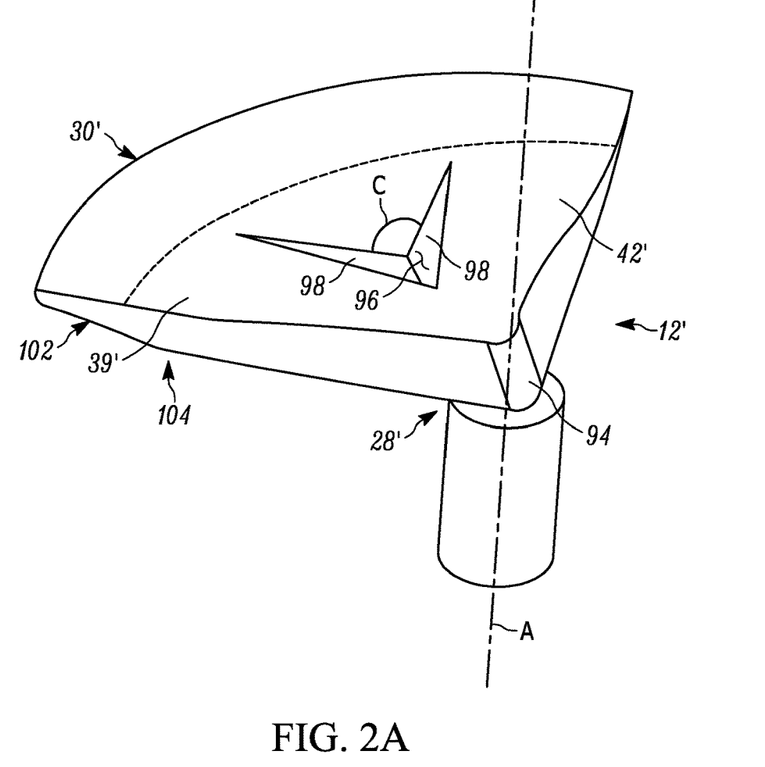
FIG. 2A is a top perspective view of another light guide pointer for use in the gauge assembly of FIGS. 1A-1E, according to the principles of the present disclosure.

In a direction as viewed by a driver of the motor vehicle when seated in a driver's seat of the motor vehicle, the gauge face 14 is disposed in front of the pointer 12. This is shown in FIG. 1, wherein the driver's eye 40 is disposed above the gauge face 14; and in FIG. 2, where the driver's eye 40 is located to the left of the gauge face 14. The pointer 12 is disposed between the gauge face 14 and the LEDs 36. The circuit board 22 is disposed between the LEDs 36 and the stepper motor 20.

As explained above, the pointer 12 has a body portion 39 formed of a light conducting material, wherein the body portion 39 is configured to receive rays of light from the light source(s) 36 and conduct the rays through the body portion 39 from the inner end 28 toward the outer end 30 and upwards out of a display side 42 of the pointer 12.

The example pointer 12 may include a light reflecting surface 44 through which light is propagated from one of LEDs 36 disposed on the printed circuit board 22 directly under the reflecting surface 44 (in the orientation of FIG. 1). Rays 46 propagate upward from the LEDs 36 through the inner chamber 48 of the light housing 32 defined by the inner wall 50, and through an opening 52 disposed about the axis of rotation A to allow light to enter the pointer 12 and to be reflected by the reflecting surface 44. The reflecting surface 44 propagates the light transverse to the axis of rotation A along the body 39 of the pointer 12 towards the outer end 30 of the pointer 12. Foil may be disposed along a bottom edge 52 of the body 39 of the pointer 12 to assist with reflecting the rays to a part of the pointer 12 that is used to illuminate the tick marks 38, which is out of the display side surface 42 and near the outer end 30.

Figure 1C:
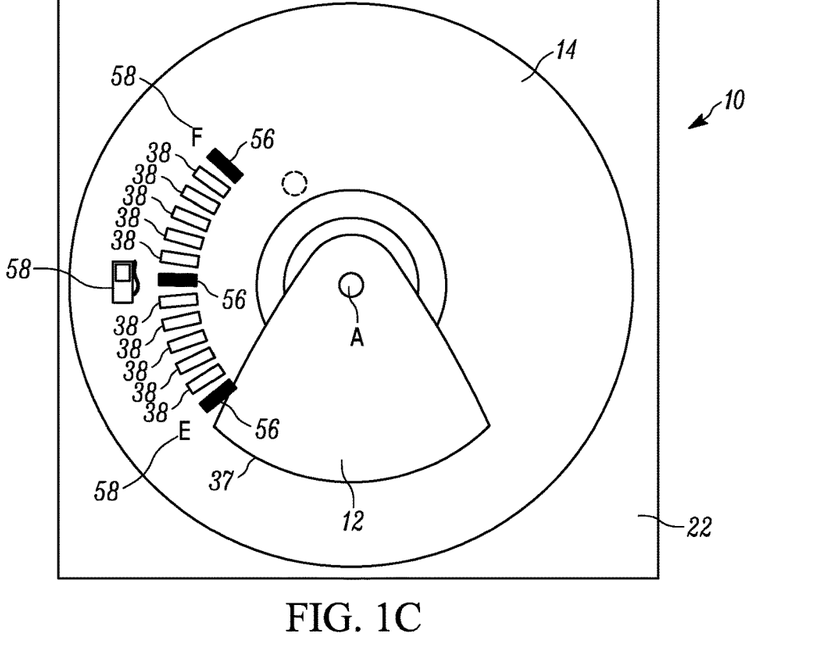
FIG. 1C is a front view of the gauge assembly of FIGS. 1A-1B showing the light guide pointer in a first position, in accordance with the principles of the present disclosure.
Figure 1D:
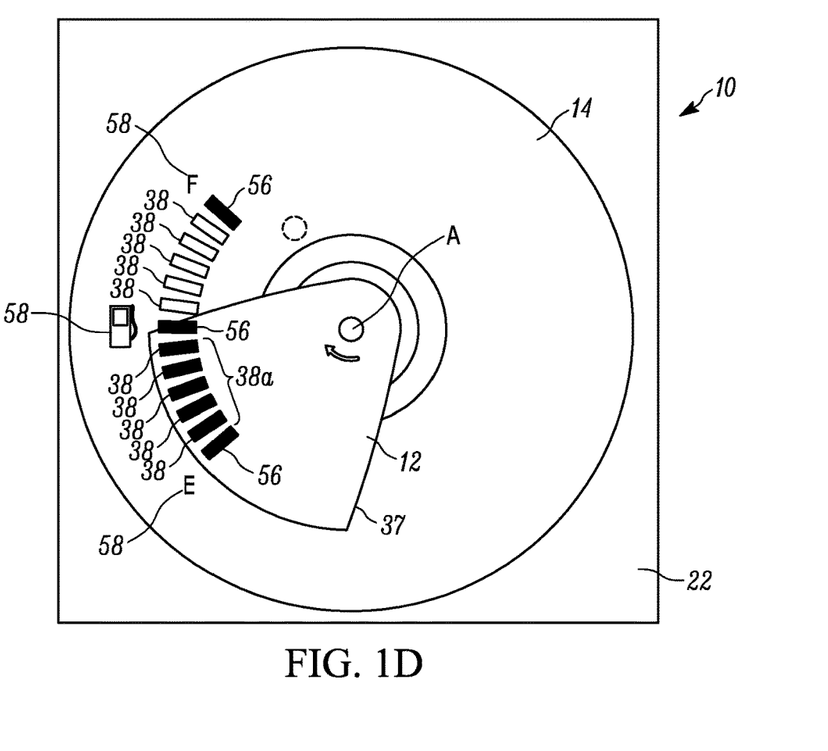
FIG. 1D is a front view of the gauge assembly of FIGS. 1A-1C showing the light guide pointer in a second position, according to the principles of the present disclosure.
Figure 1E:
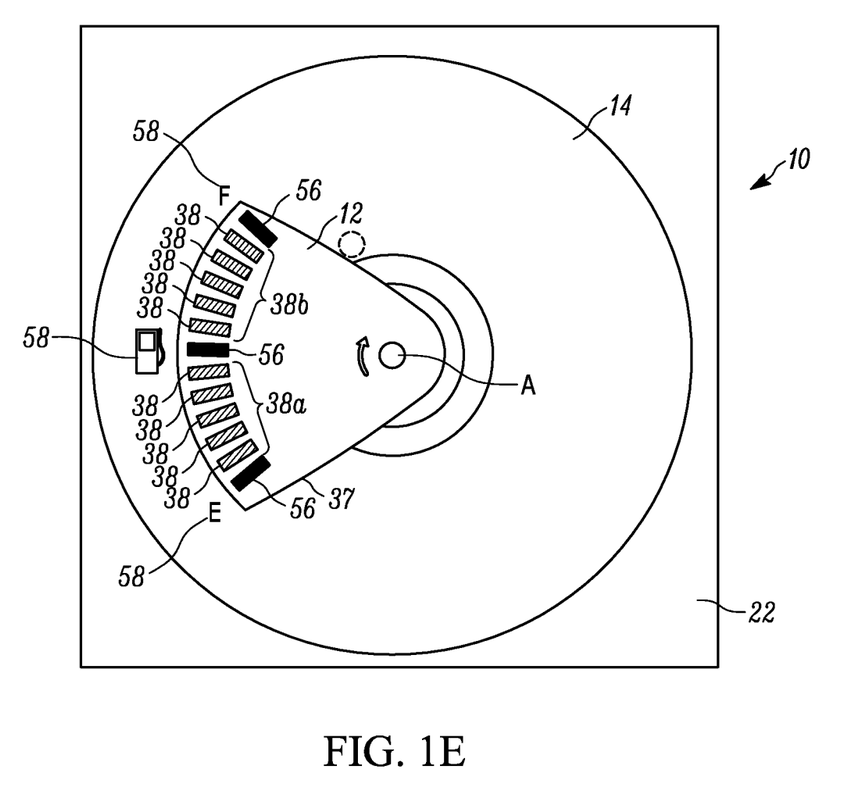
FIG. 1E is a front view of the gauge assembly of FIGS. 1A-1D showing the light guide pointer in a third position, in accordance with the principles of the present disclosure.

Referring now to FIGS. 1C-1E, the movement of the pointer 12 and the resulting illumination of the tick marks 38 is shown in greater detail. Though the fan-shaped pointer 12 is shown in FIGS. 1C-1E for purposes of clarity, it should be understood that the pointer 12 would not actually be viewable in these views because it would be blocked by the gauge surface 14. Only the portion of the pointer 12 that is disposed under the tick marks 38 in FIGS. 1D-1E would actually be visible.

FIG. 1C illustrates the pointer 12 in a first position. In the first position, the pointer 12 is not disposed directly adjacent to or under any of the tick marks 38. Accordingly, even though the pointer 12 may be illuminated by the LEDs 36 (shown in FIGS. 1A-1B), the pointer 12 does not illuminate the tick marks 38, and the tick marks 38 remain dark or not illuminated when the pointer 12 is in this first position. (In this example, the first pointer position, which is controlled by the stepper motor 22, corresponds to the fuel tank being empty).

Although the bar graph tick marks 38 remain free from illumination in FIG. 1C, other milestone tick marks 56 and associated label marks 58 may be illuminated. This could be because the milestone tick marks 56 and label marks 58 could be formed as transparent material or cut-outs, while the bar graph tick marks 38 could be formed translucently or with dead front lens material in the gauge surface 14, by way of example. One or more milestone LEDs 60 may be disposed in a pocket 62 of the light housing 22 to illuminate the milestone tick marks 56 and label marks 58, if desired (shown in FIG. 1B). In the alternative, the milestone tick marks 56 and label marks 58 may be illuminated in other manners, without falling beyond the spirit and scope of the present disclosure.

Referring now to FIG. 1D, the stepper motor 22 has now rotated the pointer 12 into a second position that corresponds to a half-full fuel status of the fuel tank. In the second position, the pointer 12 is disposed directly adjacent to and directly under a first set 38a of the tick marks 38. Thus, the pointer 12 is disposed adjacent to multiple tick marks 38. Accordingly, the light from the light guide pointer 12 illuminates the first set 38a of tick marks 38 when the pointer 12 is disposed in the second position, as illustrated in FIG. 1D.

Referring now to FIG. 1E, the stepper motor 22 has now rotated the pointer 12 into a third position that corresponds to a full fuel status of the fuel tank. In the third position, the pointer 12 is disposed directly adjacent to and directly under a first set 38a of the tick marks 38 and a second set 38b of the tick marks 38. Accordingly, the light from the light guide pointer 12 illuminates the first set 38a of tick marks 38 and the second set 38b of tick marks 38 when the pointer 12 is disposed in the third position, as illustrated in FIG. 1E.

Though first, second, and third positions of the pointer 12 are illustrated in FIGS. 1C-1E, respectively, it should be understood that the pointer 12 could be rotated by the stepper motor 20 into any number of other positions, without falling beyond the spirit and scope of the present invention, and therefore, the pointer 12 can be rotated to illuminate partial portions of the first and second sets 38a, 38b of tick marks 38 without necessarily illuminating the entire sets of the first and second sets 38a, 38b of tick marks 38. Accordingly, the pointer 12 is configured to be moved to illuminate various portions of the bar graph formed by the tick marks 38.

Referring now to FIG. 2A, another variation of the light guide pointer is illustrated and generally designated at 12'. It should be understood that the light guide pointer 12' could be substituted for the light guide pointer 12 described above, and the description above fully applies to light guide pointer 12', to the extent that the light guide pointer 12' is not described as being different from the light guide pointer 12. For example, the light guide pointer 12' may be used in the assembly 10 and with the gauge surface 14 having the plurality of indicia 16. Furthermore, similar elements are marked with the same numbers and an additional apostrophe added, to note that the description above with respect to the same numbered element should be applied.

The light guide pointer 12' has a curved reflecting surface 94 disposed at the first end 28'. The curved reflecting surface 94 is disposed at least partially around the axis of rotation A to reflect light rays originating with the LEDs 36. In the case of a stepper motor having a clear shaft, the curved reflecting surface 94 may be disposed over the axis of rotation A to receive light from a light source disposed on the axis of rotation A that propagates light through a clear stepper motor shaft. In such a case, only one LED is used. The curved reflecting surface 94 is configured to reflect rays from the LEDs 36 toward the second end 30' of the pointer 12' through the body 39' of the pointer 12'.

The pointer 12' defines a groove 96 formed in a top surface 42' of the pointer 12'. The groove 96 includes angled surfaces 98 cut into the top surface 42'. For example, the angled surfaces 98 could be disposed at an angle B with respect to the axis of rotation A. The angle B could be in the range of about 10 degrees to about 80 degrees, by way of example. In some examples, the angle B could be about 30 degrees or about 45 degrees. The groove 96 may include two angled surfaces 98 that form an angle C between themselves along the top surface 42'. The groove 96 and the angled surfaces 98 may provide for dimming of over illuminated areas to improve the overall evenness of the distribution of light.

When the pointer 12' is assembled together with the shaft 18 and the gauge face 14, as shown in FIG. 1, the groove 96 and the angled surfaces 98 may be disposed adjacent to a substantially opaque portion 100 of the gauge face 14 and spaced apart from the plurality of indicia 16. Thus, the gauge face 14 hides the groove 96 behind the substantially opaque portion 100, and the groove 96 and angled surfaces 98 are not visible through the indicia 16.

Figure 2B:
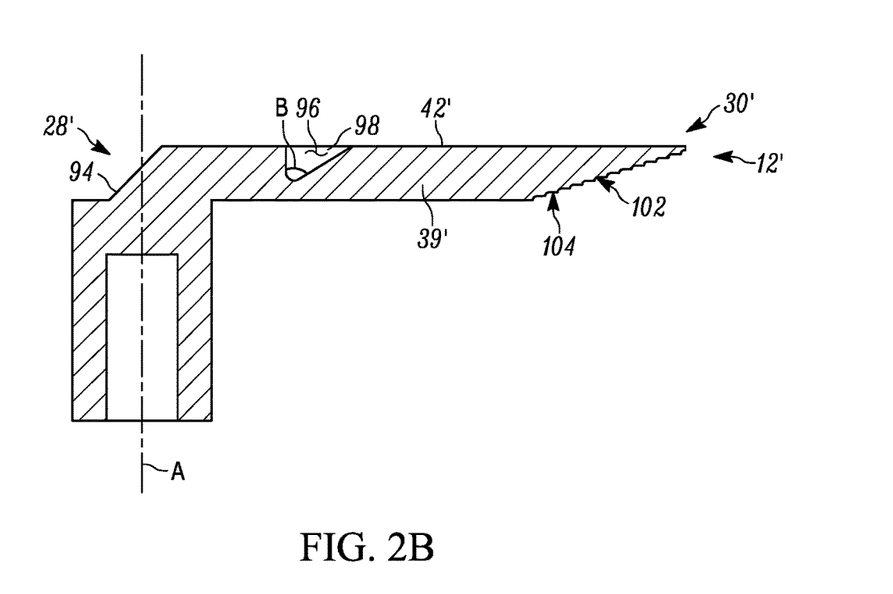
FIG. 2B is a side cross-sectional view of the light guide pointer of FIG. 2A, in accordance with the principles of the present disclosure.
Figure 2C:
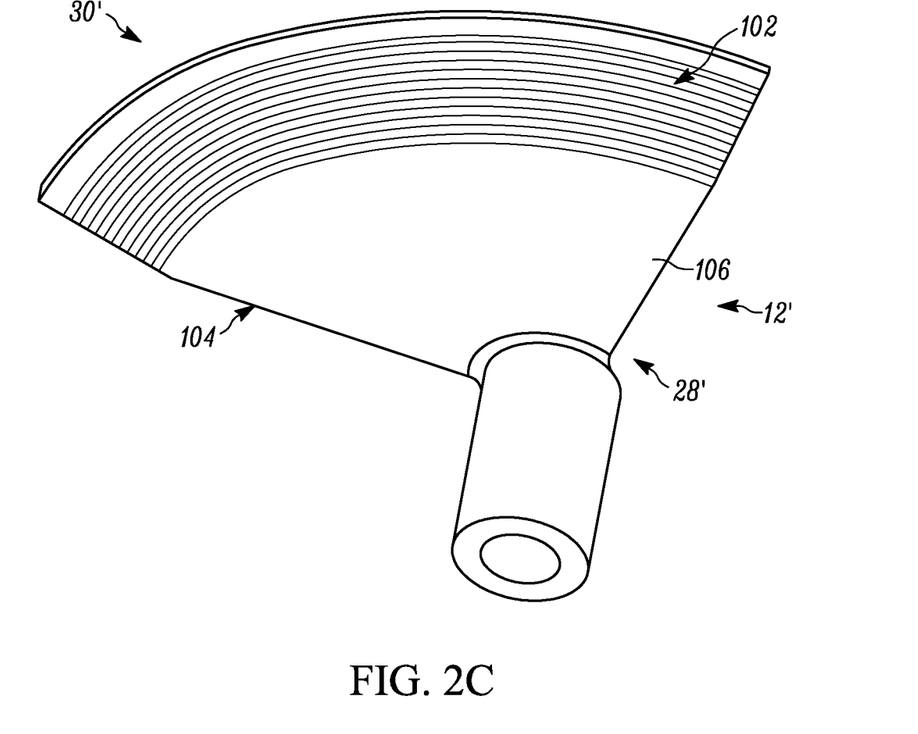
FIG. 2C is a bottom perspective view of the light guide pointer of FIGS. 2A-2B, according to the principles of the present disclosure.
Figure 2D:
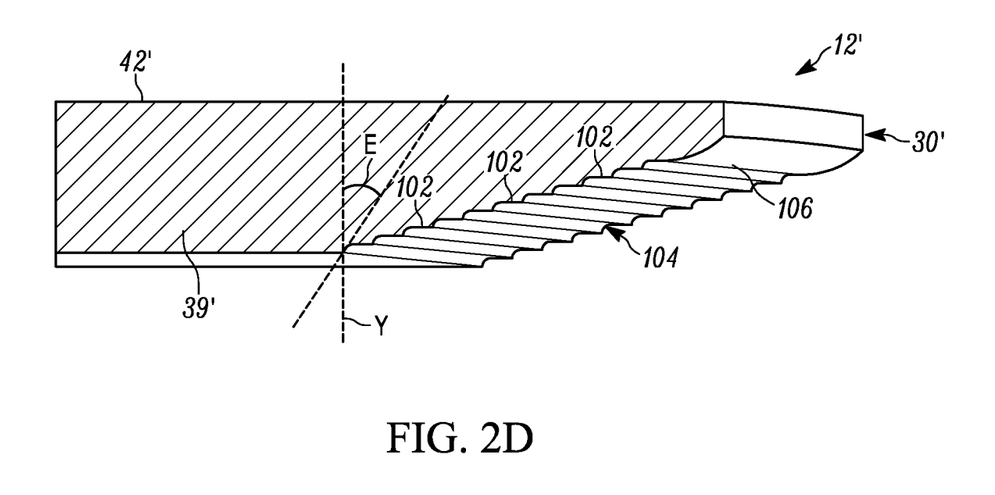
FIG. 2D is side cross-sectional view of a portion of the light guide pointer of FIGS. 2A-2C, in accordance with the principles of the present disclosure.

The pointer 12' may also define a plurality of reflecting surfaces 102, or steps, formed in a bottom surface 104 of the pointer 12' adjacent to the second end 30'. The reflecting surfaces 102 may increase the efficiency of illumination. Each reflecting surface 102 could be disposed at an angle E with respect to the axis of rotation A (in FIG. 2D, the line Y is illustrated to define the angle E, and it should be understood that Y is parallel to the axis of rotation A). The angle E (the angle between the axis of rotation A and the angled surfaces 102) could be in the range of about 15 degrees to about 75 degrees, or more preferably in the range of about 20 degrees to about 50 degrees, by way of example. In some examples, the angle B could be about 45 degrees.

When the pointer 12' is assembled together with the shaft 18 and the gauge face 14, as shown in FIG. 1, the reflecting surfaces 102 are configured to overlap with each indicium 16 of the plurality of indicia 16 as the light guide pointer 12' is rotated about the axis of rotation A. Thus, the reflecting surfaces 102 help reflect rays in an upward direction in the orientation of FIGS. 1, 2B, and 2D and out of the indicia 16 windows.

A substantially opaque shroud 106 may be disposed on an end surface 108, side surfaces 109, and/or the bottom surface 104 of the pointer 12', to prevent light leakage through the end surface 108 and the bottom surface 104 and side surfaces 109. Light leakage can lead to illumination of adjacent indicia, which is generally undesirable.

Figure 3A:
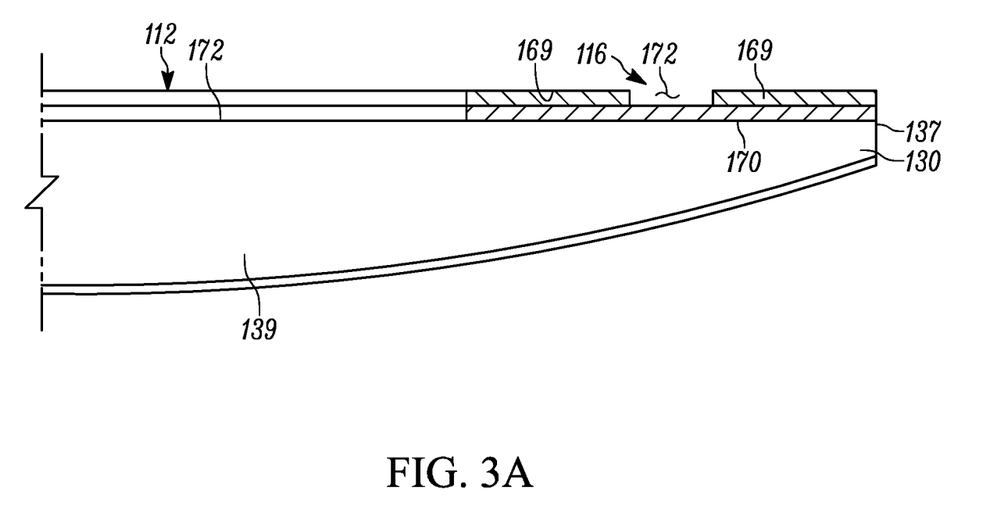
FIG. 3A is a side schematic view of yet another variation of a light guide pointer, according to the principles of the present disclosure.
Figure 3B:
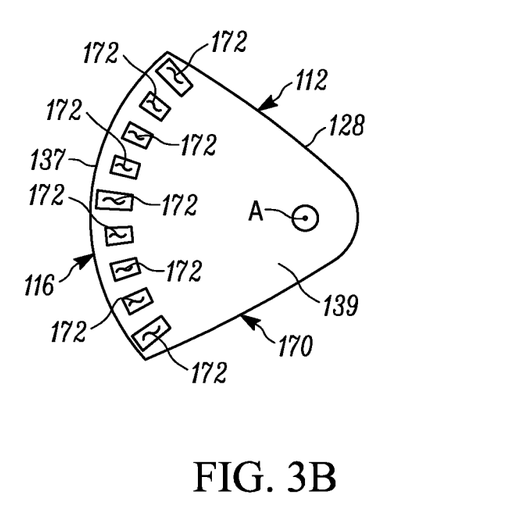
FIG. 3B is a front view of the light guide pointer of FIG. 3A, in accordance with the principles of the present disclosure.
Figure 3C:
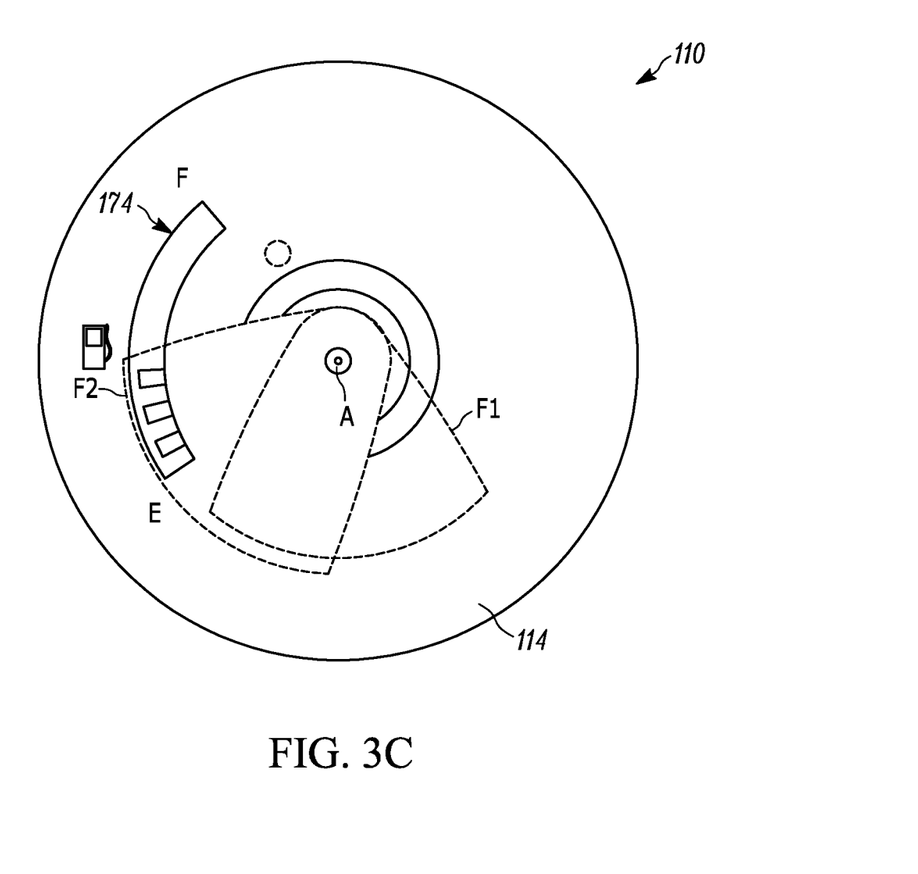
FIG. 3C is a front view of a portion of a gauge assembly incorporating the light guide pointer of FIGS. 3A-3B, with the light guide pointer shown in a first phantom position and in a second position, according to the principles of the present disclosure.

Referring now to FIGS. 3A-3C, another variation a portion of a gauge assembly is illustrated and generally designated at 110. The gauge assembly 110 may be an instrument cluster assembly 110 that may be used in a motor vehicle, similar to the gauge assembly 10 described above.

Like the gauge assembly 10 described above, the gauge assembly 110 includes a pointer 112 that is configured to rotate about an axis of rotation A, wherein the axis of rotation A extends through an appliqué surface or gauge face 114 to indicate a specific operating parameter. The pointer 112 is configured to rotate or move with respect to the gauge face 114, about the axis A. All aspects of the gauge assembly 110 that are not described as being different from the gauge assembly 10 described above may be the same. For example, the pointer 112 may be mounted to a shaft (not shown) that is connected to and driven by a stepper motor (20), and LEDs (not shown) may be used to illuminate the pointer 112.

The pointer 112 is a light guide, formed of a light conducting material that is configured to receive rays and conduct the rays therethrough. The pointer 112 has a first end 128, or inner end or proximal end, disposed over the axis of rotation A and a second end 130, or outer end or distal end, disposed a distance away from the axis of rotation A. The pointer 112 may have a fan shape, or a pie-piece shape, if desired. The second end 130 is wider than the first end 128, and the second end 130 has a curved edge 137, in this example.

A plurality of indicia 116 may be disposed on or near the second end 130 of the pointer 112. The indicia 116 may be formed on the pointer 112 in any desirable way, and in a variety of different variations. For example, in one variation, darkened portions of opaque material may be painted or otherwise provided on the pointer 112 in the form of tick marks. In the illustrated embodiment, one or more opaque material layers 169 are disposed on the body portion 139 of the pointer 112 to form the indicia 116.

The opaque material layer 169 defines one or more viewing windows 172 between edges of the opaque material layer 169. In the illustrated embodiment, the opaque material layer 169 may cover a substantial majority of the top surface 142 of the body portion 139 of the pointer 112. Only the cutouts or viewing windows 172, which define the indicia 116, are not covered by the opaque material layer 169, by way of example. Thus, the indicia 116 are tick marks in the form of cutouts in the opaque material 169 that form the look of a bar graph. A layer of translucent material 170 may also be applied to the pointer 112, which in this case is disposed between the opaque layer(s) 169 and the body portion 139 of the pointer 112. The translucent layer 170 allows the light to pass through it.

The indicia 116 are disposed closer to the outer end 130 of the pointer 112 than to the inner end 128. Each indicium 116 may be disposed equidistant from the axis of rotation A. In the illustrated embodiment, the entire bar graph of windows 172 remains illuminated so long as the LEDs (not shown, but like FIGS. 1A-1B) are turned on; however, the entirety of the pointer 112 may not always be visible, as described below.

Similar to the pointer 12 described above, the pointer 112 is configured to be disposed behind a gauge face 114, which may be opaque or translucent, or substantially opaque, by way of example. In other words, in a direction as viewed by a driver of the motor vehicle when seated in a driver's seat of the motor vehicle, the gauge face 114 is disposed in front of the pointer 112. The pointer 112 is disposed between the gauge face 114 and the LEDs (not shown). The gauge face 114 defines a gauge face viewing window 174, which may be a cut-out, a translucent portion, a transparent portion, or any other type of viewing window that allows an object behind the gauge face 114 to be viewed. The viewing window 174 has the appearance of a curved slot, in this example.

As shown in FIG. 3C, when the gauge assembly 110 is assembled, only the portion of the pointer 12 that is disposed directly behind the viewing window 174 of the gauge face 114 is visible. FIG. 3C illustrates the pointer 112 in a first phantom position F1 and a second position F2. In the first phantom position F1 (which is a first position of the pointer 112, wherein the pointer 112 is completely hidden behind the gauge face 114), the pointer 112 is not disposed directly adjacent to, or under, any portion of the gauge face viewing window 174. Accordingly, even though the pointer 112 may be illuminated by the LEDs (not shown, but can be similar to LEDs shown in FIGS. 1A-1B), the pointer 112 does not illuminate the indicia 116 because the pointer 112 is not located behind the gauge face viewing window 174 in the first phantom position F1.

In the second illustrated position F2, the stepper motor (not shown in this Figure) has now rotated the pointer 112 into a second position that corresponds to a partially full fuel status of the fuel tank. In the second position F2, the pointer 112 is disposed directly adjacent to and directly under a portion of the gauge face viewing window 174. Thus, some of the illuminated indicia 116 are viewable through the gauge face viewing window 174, creating the appearance of a bar graph. Though no further positions of the pointer 112 are illustrated, it should be understood that the pointer 112 could be rotated into any number of different positions about the axis of rotation A, such as to a half-full fuel position similar to that shown in FIG. 1D and a full fuel position similar to that shown in FIG. 1E. Accordingly, the pointer 112 is configured to be moved to display various portions of the bar graph formed by the indicia 116 through the gauge face viewing window 174.

Figure 4A:
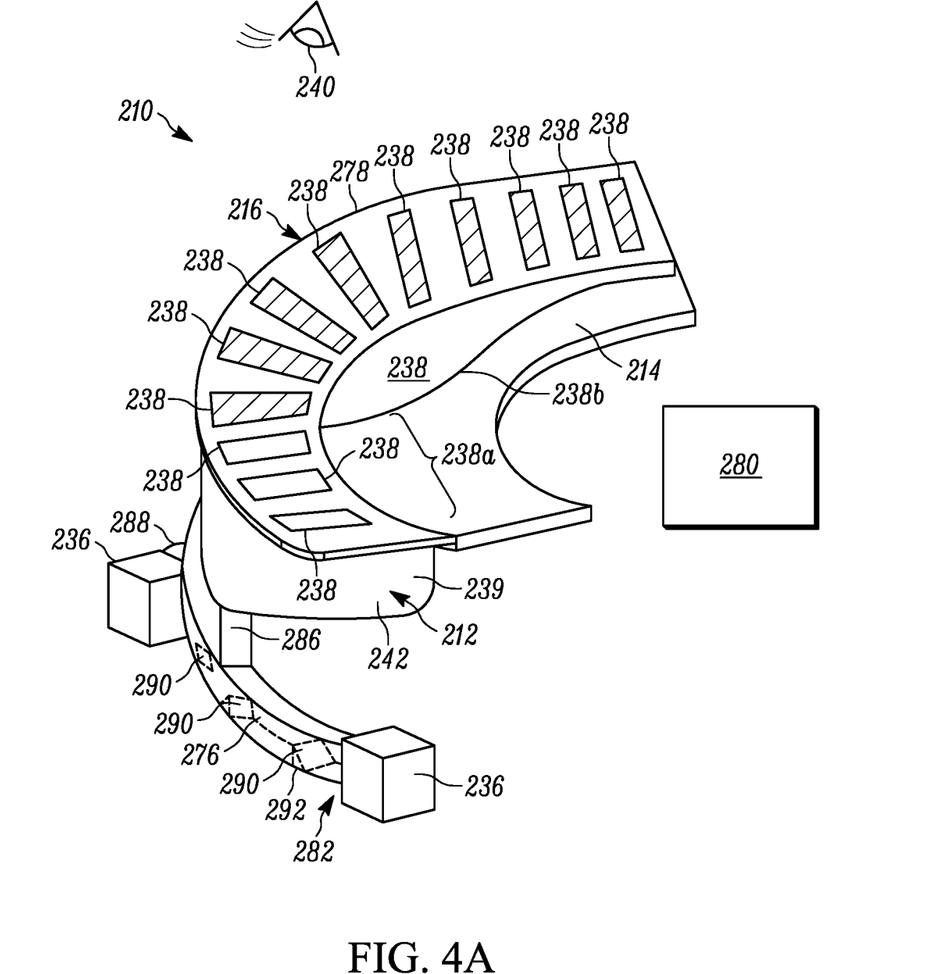
FIG. 4A is a perspective view of still another variation of a light guide pointer along with a gauge assembly, in accordance with the principles of the present disclosure.
Figure 4B:
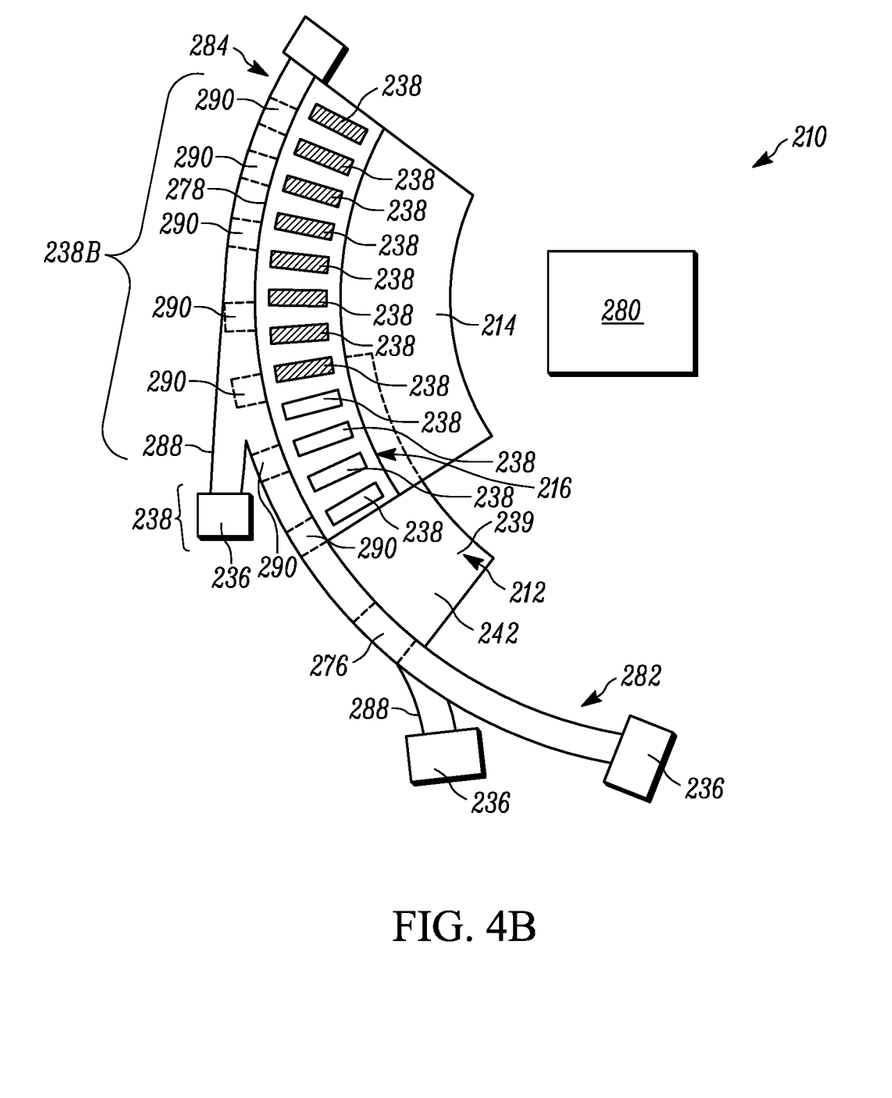
FIG. 4B is a front view of the light guide pointer and the gauge assembly of FIG. 4A, according to the principles of the present disclosure.

Referring now to FIGS. 4A-4B, another variation a gauge assembly is illustrated and generally designated at 210. The gauge assembly 210 may be an instrument cluster assembly 210 that may be used in a motor vehicle, similar to the gauge assemblies 10, 110 described above.

Like the gauge assemblies 10, 110 described above, the gauge assembly 210 includes a pointer 212 that is configured to move with respect to an appliqué surface or gauge face 214 to indicate a specific operating parameter. It should be noted that all aspects of the gauge assembly 210 that are not described as being different from the first gauge assembly 10 described above may be the same. For example, the pointer 212 may be driven by a stepper motor (not shown, but see element 20 in FIGS. 1A-1B).

The pointer 212 is a light guide, formed of a light conducting material that is configured to receive rays and conduct the rays therethrough. In this example, the pointer 212 is configured to move about the outer perimeter 278 of the gauge face 214 and about a ring shaped light guide 276 that is disposed about the perimeter 278 of the gauge face 214. Thus, the pointer 212 is configured to move with respect to the gauge face 214 and with respect to the light guide ring 276. In at least some variations, the pointer 212 is supported for movement outside of an outer periphery of the appliqué surface 214.

The appliqué surface or gauge face 214 in this example is arranged so that another gauge or display (schematically indicated at 280) may be disposed directly to the right of the gauge assembly 210. Thus, the gauge assembly 210 consumes less space to the right of the indicia 216 than the previous gauge assemblies 10, 110 described above.

LED packages 236 may be disposed at first and second ends 282, 284 of the light guide ring 276, as well as near other portions of the light guide ring 276, and/or under the light guide ring 276 and/or adjacent to the light guide ring 276. Light from any of the LED packages 236 is transmitted circumferentially around the right light guide 276 and into the pointer 212.

In this variation, the pointer 212 includes a guide body portion 286 that extends upward (in the orientation of FIG. 4A) from the light guide ring 276 to the main body portion 239 of the pointer 212. The main body portion 239 is disposed between the gauge face 214 and the light guide ring 276. In other words, in a direction as viewed by a driver of the motor vehicle when seated in a driver's seat of the motor vehicle, the gauge face 214 is disposed in front of the main body portion 239 of the pointer 212. This is shown in FIG. 3A, wherein the driver's eye 240 is disposed above the gauge face 214.

A plurality of indicia 216 is disposed on the gauge face 214, wherein the gauge face 214 defines the indicia 216. The indicia 216 may comprise a plurality of tick marks 238 arranged into a bar graph, by way of example. The tick marks 238 may be formed as pockets or cut-outs in the gauge face 214, by way of example, which are separated by a divider portion of the gauge face 214. The gauge face 214 may be opaque or translucent, or substantially opaque, by way of example. In some variations, a dead front lens may be used for the tick marks 238 and/or the gauge face 214.

The plurality of indicia 216 are configured to be selectively illuminated by the light guide pointer 212. For example, the pointer 212 is configured to be selectively moved about the perimeter 278 until it is adjacent to one or more of the indicium or tick marks 238. The pointer 212 is configured to illuminate each tick mark 238 when the light guide pointer 212 is disposed adjacent to the respective tick mark 238. More particular, the pointer 212 illuminates a tick mark 238 when the pointer 212 overlaps with that tick mark 238.

As explained above, the pointer 212 has a main body portion 239 formed of a light conducting material, where the main body portion 239 is configured to receive rays from the light source(s) 236 and conduct the rays through the main body portion 239 and upwards out of a display side 242 of the pointer 212. To accomplish this, light is funneled into the light guide ring 276 from the ends 282, 284 and intermediate legs 288 into the light guide ring 276 in a direction that is tangential to the overall circumferential shape of the light guide ring 276. The light guide ring 276 includes a plurality of reflective surfaces 290, which are angled surfaces, which may be cuts in the underside 292 of the light guide ring 276. The reflective surfaces 290 are configured to reflect and transmit the transverse rays upward into the pointer 212. The pointer 212 may then have its own reflective surface configured to reflect the light along the main body 239 of the pointer 212, similar to the reflective surface 44 described above with respect to FIGS. 1A-1B.

Similar to the previous gauge assemblies 10, 110 described, the pointer 212 is configured to move into a multitude of positions to selectively illuminate one or more of the tick marks 238. For example, in the position illustrated in FIGS. 4A-4B, the pointer 212 is disposed directly adjacent to and directly under a portion of the gauge face 214 and some of the tick marks 238. Thus, the tick marks 238 in a first section 238*a* directly adjacent to the pointer 212 are illuminated, while other tick marks 238 in a second section 238*b* remain free from being illuminated when the pointer 212 is in the position shown in FIGS. 4A-4B. This creates the appearance of a partially illuminated bar graph. Though no further positions of the pointer 212 are illustrated, it should be understood that the pointer 212 could be rotated into any number of different positions about the perimeter 278, such as to a half-full fuel position similar to that shown in FIG. 1D and a full fuel position similar to that shown in FIG. 1E. Accordingly, the pointer 212 is configured to be moved to display various positions along the bar graph formed by the indicia 216.

Accordingly, the example gauge assembly reduces the size of the mandatory gap between pockets that form tick marks because there is no longer an actual wall required between LEDs disposed in pockets. Further, the number of LEDs and associated electronics is reduced. Using the fan-shaped pointer to illuminate multiple tick marks at a time eliminates the need to use a separate LED to illuminate each tick mark.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly for a motor vehicle comprising:
a light guide pointer supported for rotation about an axis of rotation, the light guide pointer having a first end disposed over the axis of rotation and a second end disposed a distance away from the axis of rotation, the second end being wider than the first end, wherein a groove formed in a top surface of the pointer;
a plurality of indicia disposed about the axis of rotation, the plurality of indicia configured to be selectively illuminated by the light guide pointer, wherein the second end of the light guide pointer is configured to be selectively rotated adjacent to each indicium of the plurality of indicia and to illuminate each indicium when the second end of the light guide pointer is disposed adjacent to each indicium.

2. The gauge assembly of claim 1, wherein the second end of the pointer is configured to be disposed adjacent to multiple indicia of the plurality of indicia simultaneously.

3. The gauge assembly of claim 2, further comprising a gauge face disposed adjacent to the pointer, the gauge face defining the plurality of indicia.

4. The gauge assembly of claim 3, wherein each indicium of the plurality of indicia is a tick mark.

5. The gauge assembly of claim 4, wherein each tick mark is one of a pocket and a cut-out provided in the gauge face.

6. The gauge assembly of claim 5, wherein in a direction as viewed by a driver of the motor vehicle when seated in a driver's seat of the motor vehicle, the gauge face is disposed in front of the pointer.

7. The gauge assembly of claim 5, wherein the pointer has a fan shape.

8. The gauge assembly of claim 5, wherein the pointer has a pie piece shape with a curved edge at the second end of the pointer.

9. The gauge assembly of claim 8, further comprising at least one light source disposed adjacent to the first end of the pointer, the pointer being disposed between the gauge face and the at least one light source.

10. The gauge assembly of claim 9, wherein the at least one light source is a light-emitting diode (LED) package, the gauge assembly further comprising a circuit board and a stepper motor driven by the circuit board, the circuit board being disposed between the stepper motor and the at least one LED package.

11. The gauge assembly of claim 10, wherein the plurality of tick marks forms a bar graph, the pointer being configured to selectively light up at least a portion of the bar graph.

12. The gauge assembly of claim 11, wherein the gauge face is substantially opaque, and light from the pointer is selectively viewable through the plurality of indicia.

13. The gauge assembly of claim 1, the pointer having a curved reflecting surface disposed at the first end over the axis of rotation.

14. The gauge assembly of claim 1, the pointer defining a plurality of reflecting surfaces disposed adjacent to the second end, the plurality of reflecting surfaces being configured to overlap with each indicium of the plurality of indicia as the light guide pointer is rotated about the axis of rotation.

15. The gauge assembly of claim 1, wherein the groove is disposed adjacent to a substantially opaque portion of the gauge face and spaced apart from the plurality of indicia.

16. The gauge assembly of claim 15, further comprising a substantially opaque shroud disposed on an end surface and a bottom surface of the pointer.

17. A pointer for an instrument cluster assembly of a motor vehicle, the pointer comprising:
a body portion formed of a light conducting material, the body portion configured to receive rays from a light source and conduct the rays through the body portion, the body portion having an inner end and an outer end, the outer end being wider than the inner end, the body portion having a fan shape; and
opaque material disposed on the body portion, the opaque material defining a plurality of indicia on the pointer.

* * * * *